United States Patent
Wu

(10) Patent No.: US 12,362,603 B2
(45) Date of Patent: Jul. 15, 2025

(54) WIRELESS CHARGING RECEIVER AND WIRELESS CHARGING SYSTEM, AND METHOD AND APPARATUS FOR CONTROLLING WIRELESS CHARGING

(71) Applicant: BEIJING XIAOMI MOBILE SOFTWARE CO., LTD., Beijing (CN)

(72) Inventor: Kaiqi Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 758 days.

(21) Appl. No.: 17/489,601

(22) Filed: Sep. 29, 2021

(65) Prior Publication Data

US 2022/0311283 A1 Sep. 29, 2022

(30) Foreign Application Priority Data

Mar. 25, 2021 (CN) .......................... 202110322052.0

(51) Int. Cl.
*H02J 50/40* (2016.01)
*H02J 50/10* (2016.01)
(Continued)

(52) U.S. Cl.
CPC .............. *H02J 50/80* (2016.02); *H02J 50/10* (2016.02); *H02J 50/402* (2020.01); *H02J 50/60* (2016.02);
(Continued)

(58) Field of Classification Search
CPC ....... H04B 5/263; H04B 5/26; H02J 7/00034; H02J 50/40; H02J 50/10; H02J 50/402; H02J 50/60; H02J 50/90; H02J 50/80
USPC .......................................... 320/108; 307/104
See application file for complete search history.

(56) References Cited

U.S. PATENT DOCUMENTS 8,410,637 B2 * 4/2013 Karaoguz .......... G06K 7/10346
307/104
8,436,491 B2 * 5/2013 Walley .................... H02J 50/10
307/104

(Continued)

FOREIGN PATENT DOCUMENTS

CN 104040835 A * 9/2014 ............. H01F 27/02
CN 112039224 A 12/2020
(Continued)

OTHER PUBLICATIONS

Extended European Search Report of EP Application No. 21205581.8 dated Apr. 4, 2022, (10p).

*Primary Examiner* — John T Trischler
(74) *Attorney, Agent, or Firm* — Arch & Lake LLP; Hao Tan; Shen Wang

(57) ABSTRACT

A method for controlling wireless charging is applied to the wireless charging receiver. The wireless charging receiver comprises a plurality of receiving coils, and the plurality of receiving coils at least comprise a first type of coil and a second type of coil. The method for controlling wireless charging comprises: controlling the plurality of receiving coils to be in a charging receiving mode and/or a signal communication mode; taking a coil in the signal communication mode among the plurality of receiving coils as the first type of coil to communicate with a wireless charging transmitter; and taking a coil in the charging receiving mode among the plurality of receiving coils as the second type of coil to receive charging energy transmitted by the wireless charging transmitter.

16 Claims, 9 Drawing Sheets

(51) Int. Cl.
*H02J 50/60* (2016.01)
*H02J 50/80* (2016.01)
*H02J 50/90* (2016.01)
*H04B 5/26* (2024.01)
*H04B 5/79* (2024.01)
*H02J 7/00* (2006.01)

(52) U.S. Cl.
CPC ............... *H02J 50/90* (2016.02); *H04B 5/26* (2024.01); *H04B 5/263* (2024.01); *H02J 7/00032* (2020.01); *H02J 7/00034* (2020.01); *H02J 50/40* (2016.02); *H04B 5/79* (2024.01)

(56) References Cited

U.S. PATENT DOCUMENTS

| | | | | |
|---|---|---|---|---|
| 8,618,697 | B2 * | 12/2013 | Karaoguz | G06K 19/0715 307/104 |
| 9,094,054 | B2 * | 7/2015 | Walley | H02J 50/10 |
| 9,362,986 | B2 * | 6/2016 | Karaoguz | H02J 50/12 |
| 9,413,191 | B2 * | 8/2016 | Kim | H04B 1/3833 |
| 9,438,067 | B2 * | 9/2016 | Na | H02J 50/50 |
| 9,583,803 | B2 * | 2/2017 | Miller | H01M 50/342 |
| 9,653,942 | B2 * | 5/2017 | Kim | H01Q 1/38 |
| 9,666,915 | B2 * | 5/2017 | Miller | H02J 50/80 |
| 9,800,292 | B2 * | 10/2017 | Chen | G06F 3/0446 |
| 9,806,767 | B2 * | 10/2017 | Walley | G06K 7/10207 |
| 9,825,484 | B2 * | 11/2017 | Van Bosch | H02J 50/10 |
| 9,837,646 | B2 * | 12/2017 | Miller | H01M 50/24 |
| 9,859,594 | B2 * | 1/2018 | Miller | H02J 50/12 |
| 9,991,753 | B2 * | 6/2018 | Miller | H02J 50/402 |
| 10,050,478 | B2 * | 8/2018 | Kim | H01Q 7/06 |
| 10,056,790 | B2 * | 8/2018 | Miller | H01M 50/24 |
| 10,063,100 | B2 * | 8/2018 | Singh | H01F 27/38 |
| 10,074,837 | B2 * | 9/2018 | Miller | H02J 7/0044 |
| 10,236,118 | B1 * | 3/2019 | Bana | H02J 7/0042 |
| 10,284,023 | B2 * | 5/2019 | Kim | H01F 27/245 |
| 10,491,049 | B2 * | 11/2019 | Kim | H01F 27/2828 |
| 10,636,563 | B2 * | 4/2020 | Peralta | H01F 27/2871 |
| 10,658,869 | B2 * | 5/2020 | Muratov | H02J 50/90 |
| 10,944,298 | B2 * | 3/2021 | Kim | H01F 38/14 |
| 10,985,619 | B2 * | 4/2021 | Walley | G06K 19/0723 |
| 11,018,531 | B2 * | 5/2021 | Kim | H04B 5/72 |
| 11,081,795 | B2 * | 8/2021 | Lee | H04B 5/72 |
| 11,146,121 | B2 * | 10/2021 | Nakao | H04B 5/79 |
| 11,309,627 | B2 * | 4/2022 | Lim | H01Q 1/38 |
| 11,316,386 | B2 * | 4/2022 | Wu | H04W 72/566 |
| 11,329,521 | B2 * | 5/2022 | He | B60L 53/124 |
| 11,336,335 | B2 * | 5/2022 | Wu | H02J 50/10 |
| 11,502,555 | B2 * | 11/2022 | Kim | H02J 50/80 |
| 11,515,731 | B2 * | 11/2022 | Nagaoka | H02J 50/40 |
| 11,569,577 | B2 * | 1/2023 | Sohn | H02J 50/10 |
| 11,685,269 | B2 * | 6/2023 | Kanakasabai | B60L 53/124 324/243 |
| 11,705,746 | B2 * | 7/2023 | Kim | H02J 7/0042 320/108 |
| 11,715,965 | B2 * | 8/2023 | Wu | H02J 50/10 320/108 |
| 11,742,701 | B2 * | 8/2023 | Draak | H02J 50/60 307/104 |
| 11,955,809 | B2 * | 4/2024 | Singh | H01F 27/38 |
| 12,126,182 | B2 * | 10/2024 | Wu | H01F 38/14 |
| 12,184,082 | B2 * | 12/2024 | Mishima | B60L 53/124 |
| 2011/0127843 | A1 * | 6/2011 | Karaoguz | G06K 7/10207 307/104 |
| 2011/0127844 | A1 * | 6/2011 | Walley | G06K 7/10207 307/104 |
| 2011/0127952 | A1 * | 6/2011 | Walley | G06K 19/0715 320/108 |
| 2011/0127953 | A1 * | 6/2011 | Walley | G06K 19/0723 320/108 |
| 2011/0130093 | A1 * | 6/2011 | Walley | H02J 50/10 307/104 |
| 2013/0229066 | A1 * | 9/2013 | Karaoguz | H02J 50/80 307/104 |
| 2014/0117772 | A1 * | 5/2014 | Karaoguz | H02J 50/12 307/104 |
| 2014/0184150 | A1 * | 7/2014 | Walley | H04B 5/263 320/108 |
| 2014/0210406 | A1 * | 7/2014 | Na | H02J 50/50 320/108 |
| 2015/0054455 | A1 * | 2/2015 | Kim | H02J 50/70 320/108 |
| 2015/0362333 | A1 * | 12/2015 | Miller | H02J 7/0044 340/870.02 |
| 2015/0364799 | A1 * | 12/2015 | Miller | H02J 50/80 320/108 |
| 2015/0364945 | A1 * | 12/2015 | Miller | H01M 10/482 320/108 |
| 2015/0365135 | A1 * | 12/2015 | Miller | H02J 50/80 307/104 |
| 2015/0365136 | A1 * | 12/2015 | Miller | H02J 50/80 307/104 |
| 2015/0365137 | A1 * | 12/2015 | Miller | H01M 50/342 307/104 |
| 2015/0365138 | A1 * | 12/2015 | Miller | H04B 5/79 307/104 |
| 2015/0365737 | A1 * | 12/2015 | Miller | H02J 50/10 340/870.02 |
| 2016/0126639 | A1 * | 5/2016 | Kim | H04B 5/72 307/104 |
| 2016/0141881 | A1 * | 5/2016 | Hassan-Ali | H02J 50/10 307/104 |
| 2016/0211702 | A1 * | 7/2016 | Muratov | H01F 27/38 |
| 2016/0285514 | A1 * | 9/2016 | Chen | G06F 3/04162 |
| 2016/0315497 | A1 * | 10/2016 | Kim | H04B 5/72 |
| 2016/0336791 | A1 * | 11/2016 | Na | H02J 50/12 |
| 2016/0345125 | A1 * | 11/2016 | Kim | G06Q 20/326 |
| 2017/0040105 | A1 * | 2/2017 | Peralta | H01F 38/14 |
| 2017/0040694 | A1 * | 2/2017 | Singh | H01F 27/38 |
| 2017/0047636 | A1 * | 2/2017 | Lee | H01Q 5/321 |
| 2017/0063128 | A1 * | 3/2017 | Van Bosch | H02J 50/005 |
| 2017/0125758 | A1 * | 5/2017 | Miller | H04B 5/79 |
| 2017/0208158 | A1 * | 7/2017 | Kim | H01F 27/2804 |
| 2018/0130984 | A1 * | 5/2018 | Miller | A61B 5/0015 |
| 2018/0248413 | A1 * | 8/2018 | Miller | H01M 50/24 |
| 2018/0301933 | A1 * | 10/2018 | Lee | H02J 50/90 |
| 2018/0331583 | A1 * | 11/2018 | Kim | H04B 5/266 |
| 2019/0097461 | A1 * | 3/2019 | Singh | H01F 38/14 |
| 2019/0222072 | A1 * | 7/2019 | Kim | H02J 50/80 |
| 2019/0305827 | A1 * | 10/2019 | Walley | G06K 7/10346 |
| 2019/0372228 | A1 * | 12/2019 | Lee | H01Q 1/2225 |
| 2020/0028385 | A1 * | 1/2020 | Kim | H01Q 7/06 |
| 2020/0336019 | A1 * | 10/2020 | Kim | H04B 5/266 |
| 2020/0350956 | A1 * | 11/2020 | Wu | H04M 1/72412 |
| 2020/0381958 | A1 * | 12/2020 | Wu | H04W 4/80 |
| 2021/0044019 | A1 * | 2/2021 | Sohn | H04B 5/43 |
| 2021/0091605 | A1 * | 3/2021 | Nakao | H04B 5/266 |
| 2021/0138917 | A1 * | 5/2021 | Kanakasabai | G01V 3/107 |
| 2021/0210991 | A1 * | 7/2021 | He | H02J 50/12 |
| 2021/0234410 | A1 * | 7/2021 | Kim | H04M 1/03 |
| 2021/0234412 | A1 * | 7/2021 | Walley | H02J 50/10 |
| 2021/0351630 | A1 * | 11/2021 | Kim | H02J 50/80 |
| 2022/0045421 | A1 * | 2/2022 | Lim | H01Q 21/06 |
| 2022/0052554 | A1 * | 2/2022 | Nagaoka | H02J 50/12 |
| 2022/0052555 | A1 * | 2/2022 | Nagaoka | H02J 50/12 |
| 2022/0069601 | A1 * | 3/2022 | Wu | H02J 7/0045 |
| 2022/0069621 | A1 * | 3/2022 | Wu | H02J 50/005 |
| 2022/0173624 | A1 * | 6/2022 | Draak | H02J 50/60 |
| 2022/0278554 | A1 * | 9/2022 | Mishima | B60L 53/124 |
| 2022/0320902 | A1 * | 10/2022 | Lu | H02J 7/007192 |
| 2023/0023680 | A1 * | 1/2023 | Wu | H02J 50/402 |
| 2023/0307951 | A1 * | 9/2023 | Okabe | H01F 38/14 |
| 2023/0331103 | A1 * | 10/2023 | Kanakasabai | H02J 50/10 |
| 2023/0361607 | A1 * | 11/2023 | Draak | H02J 50/10 |

FOREIGN PATENT DOCUMENTS

| | | | | |
|---|---|---|---|---|
| CN | 112039224 B | * | 6/2022 | ......... A61B 5/02141 |
| CN | 113452160 B | * | 3/2024 | ............. H01F 27/28 |
| JP | 2012157126 A | * | 8/2012 | ............. H01M 10/44 |
| WO | WO-2014176838 A1 | * | 11/2014 | ............... H02J 5/005 |

(56) References Cited

FOREIGN PATENT DOCUMENTS

| WO | WO-2017027326 A1 | * | 2/2017 | ....... G06K 19/07773 |
| WO | WO-2020140928 A1 | * | 7/2020 | ......... A61N 1/37512 |
| WO | WO-2024009485 A1 | * | 1/2024 | |

* cited by examiner

WIRELESS CHARGING RECEIVER AND WIRELESS CHARGING SYSTEM, AND METHOD AND APPARATUS FOR CONTROLLING WIRELESS CHARGING

CROSS REFERENCE TO RELATED APPLICATION

The present application claims the priority to the Chinese Patent Application No. 202110322052.0 filed on Mar. 25, 2021, the entire content of which is incorporated herein by reference for all purposes.

TECHNICAL FIELD

The present disclosure relates to the technical field of wireless charging, and in particular to a wireless charging receiver and a wireless charging system, and a method and an apparatus for controlling wireless charging.

BACKGROUND

With the development of science and technology, a mobile terminal plays an important role in people's life and meets all aspects of needs in people's work and life. The normal operation of the terminal needs to rely on the endurance capability of a battery, and a charging mode of the mobile terminal also realizes the development from a wired charging method that relies on a fixed power supply matched with a charging line to a wireless charging method. During wireless charging, no wires are required between the terminal and a charging device for connection, which brings convenience in use.

The implementation of wireless charging includes electromagnetic induction, magnetic field resonance, radio waves, etc., among which the most widely used is to use a principle of electromagnetic induction to realize wireless charging. The principle is that coils are disposed at a transmitter and a receiver respectively, the coil of the transmitter is connected with a wired power supply to generate an electromagnetic signal, and the coil of the receiver induces the electromagnetic signal of the transmitter to generate a current to charge the terminal. The wireless charging receiver is provided with a single receiving coil, which can only realize reception of charging energy during charging, and cannot realize other functions.

SUMMARY

According to a first aspect of the present disclosure, a wireless charging receiver is provided. The wireless charging receiver comprises a plurality of receiving coils; the plurality of receiving coils at least comprise a first type of coil communicating with a wireless charging transmitter, and a second type of coil receiving charging energy transmitted by the wireless charging transmitter; the first type of coil is a designated coil in the plurality of receiving coils, or comprises different receiving coils multiplexed in a time-division mode; and the second type of coil and the first type of coil are the same coil or different coils.

According to a second aspect of the present disclosure, a wireless charging system is provided. The wireless charging system comprises a wireless charging transmitter and a wireless charging receiver; the wireless charging transmitter comprises a transmitting coil; and the wireless charging receiver is the above-mentioned wireless charging receiver comprising a plurality of receiving coils. The plurality of receiving coils at least comprise a first type of coil communicating with the wireless charging transmitter, and a second type of coil receiving charging energy transmitted by the wireless charging transmitter; the first type of coil is a designated coil in the plurality of receiving coils, or comprises different receiving coils multiplexed in a time-division mode; and the second type of coil and the first type of coil are the same coil, or the different coils.

According to a third aspect of the present disclosure, a method for controlling wireless charging is provided, and applied to a wireless charging receiver. The wireless charging receiver comprises a plurality of receiving coils, and the plurality of receiving coils at least comprise a first type of coil and a second type of coil. The method for controlling wireless charging comprises: controlling the plurality of receiving coils to be in a charging receiving mode or a signal communication mode; taking a coil in the signal communication mode among the plurality of receiving coils as the first type of coil to communicate with a wireless charging transmitter; and taking a coil in the charging receiving mode among the plurality of receiving coils as the second type of coil to receive charging energy transmitted by the wireless charging transmitter.

It should be understood that the general description above and the detailed description below are only exemplary and explanatory and cannot limit the present disclosure.

BRIEF DESCRIPTION OF THE DRAWINGS

Accompanying drawings here are incorporated in the specification, constitute a part of the specification, illustrate examples consistent with the present disclosure and, together with the specification, serve to explain principles of the present disclosure.

DETAILED DESCRIPTION

Figure 1:
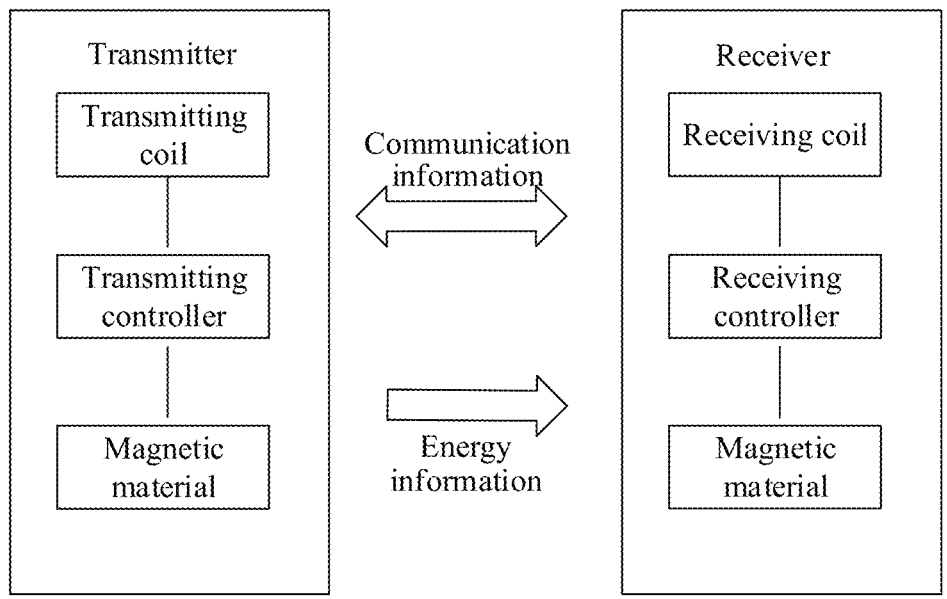
FIG. 1 is a block diagram of a wireless charging system shown according to one or more examples of the present disclosure.

The exemplary embodiments will be illustrated in detail here, and its examples are shown in the accompanying drawings. When the following description refers to the drawings, unless otherwise indicated, the same numbers in the different drawings indicate the same or similar elements. The implementations described in the following exemplary embodiments do not represent all implementations consistent with the present disclosure. Rather, they are merely examples of apparatuses and methods consistent with some aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Information transmission through magnetic induction is one of key technologies of mobile devices, and functions such as power energy transfer and signal communication can be realized by means of magnetic induction coupling. The power energy transfer may be realized in a wireless charging technology.

The wireless charging technology, also known as inductive charging and non-contact charging, is a new type of charging technology generated from a wireless power transmission technology. The wireless charging technology uses near-field induction, and a wireless charging apparatus and a charging terminal transfer energy through inductive coupling without wire connection. The wireless charging apparatus transmits the energy to the charging terminal, and the terminal receives the energy to charge a battery of the terminal to provide energy for the use of the terminal.

FIG. 1 is a block diagram of a wireless charging system shown according to an exemplary example of the present disclosure. The wireless charging system comprises a wireless charging transmitter and a wireless charging receiver. The wireless charging transmitter may be disposed in a wireless charging device, and the wireless charging receiver may be disposed at a terminal to be charged, which is a terminal receiving a charging signal transmitted by the wireless charging transmitter. The wireless charging transmitter comprises a transmitting controller, a transmitting coil, and a magnetic material at the transmitting coil. The wireless charging receiver comprises a receiving coil, a magnetic material at the receiving coil, and a receiving controller. In a charging process of the terminal, a power conversion module of the wireless charging transmitter transfers energy to a power receiving module of the wireless charging receiver, the wireless charging receiver transfers information to the wireless charging transmitter through load modulation, and the wireless charging transmitter transfers information to the wireless charging receiver through frequency modulation, so as to realize the charging of the terminal.

In the prior art, one transmitting coil in a wireless charging transmitter corresponds to one receiving coil of a wireless charging receiver, which cannot increase charging power and affects the charging efficiency.

Therefore, the present disclosure provides a wireless charging receiver. The wireless charging receiver is provided with a plurality of receiving coils. A first type of coil in the receiving coils is in signal communication with the wireless charging transmitter, and a second type of coil in the receiving coils receives wireless charging energy.

The technical solutions provided by the examples of the present disclosure can achieve the following beneficial effects: a plurality of receiving coils are disposed at the wireless charging receiver, and the plurality of receiving coils are controlled to be in the charging receiving mode and/or the signal communication mode, that is, the first type of coil in the receiving coils is controlled to be in signal communication with the wireless charging transmitter, and the second type of coil in the receiving coils is controlled to receive wireless charging energy, thereby realizing flexible and effective control of the plurality of receiving coils of the wireless charging receiver.

Figure 2:
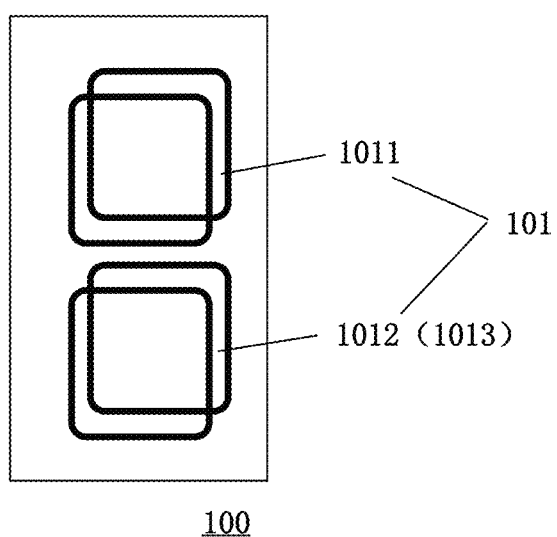
FIG. 2 is a block diagram of a wireless charging receiver shown according to one or more examples of the present disclosure.

FIG. 2 is a block diagram of a wireless charging receiver shown according to an example of the present disclosure. As shown in FIG. 2, the wireless charging receiver 100 comprises a plurality of receiving coils 101, and the plurality of receiving coils at least comprise a first type of coil 1011 and a second type of coil 1012.

In the example of the present disclosure, the wireless charging receiver 100 may be applied to a mobile terminal. The wireless charging receiver 100 communicates with a wireless charging transmitter to receive the charging energy and communication information transmitted by the wireless charging transmitter, so as to realize the charging of the mobile terminal with the wireless charging receiver 100. The first type of coil 1011 in the plurality of receiving coils 101 communicates with the wireless charging transmitter, and the second type of coil 1012 receives the charging energy transmitted by the wireless charging transmitter. It is understandable that the number of the first type of coil 1011 may be one or more, and the number of the second type of coil 1012 may be one or more. The first type of coil 1011 is a designated coil in the plurality of receiving coils, or comprises different receiving coils multiplexed in a time-division mode, that is, the different receiving coils may communicate with the wireless charging transmitter in a time-division mode. It is understandable that single first type of coil 1011 communicates with the wireless charging transmitter at the same moment. The second type of coil 1012 and the first type of coil 1011 may be the same coil, or the different coils. When the second type of coil 1012 and the first type of coil 1011 are the same coil, this coil communicates with the wireless charging transmitter, and receives the charging energy transmitted by the wireless charging transmitter.

In one example, the plurality of receiving coils 101 further comprise a third type of coil 1013, and the third type of coil 1013 is configured to send a monitoring signal which is used for monitoring an operating scenario of the wireless charging receiver. For example, in the process of wireless charging, if there is foreign matter outside, the magnetic induction coupling of the receiving coils 101 is affected, such that the coupling is interfered, and especially the presence of metal foreign matter has a stronger influence on a magnetic induction coupling effect of the receiving coils 101. The third type of coil 1013 sends the monitoring signal to monitor the operating scenario of the wireless charging receiver 100 and ensure the normal progress of charging.

In one example, the third type of coil 1013, the second type of coil 1012 and the first type of coil 1011 respectively correspond to the different coils in the plurality of receiving coils 101. In the example of the present disclosure, the wireless charging receiver 100 communicates with the wireless charging transmitter to receive the charging energy and the communication information transmitted by the wireless charging transmitter. The wireless charging receiver 100 comprises the plurality of receiving coils 101, wherein the first type of coil 1011 communicates with the wireless charging transmitter, the second type of coil 1012 receives the charging energy transmitted by the wireless charging transmitter, and the third type of coil 1013 is configured to send the monitoring signal which is used for monitoring the operating scenario of the wireless charging receiver. It may be that the different coils of the plurality of receiving coils 101 are controlled to respectively receive the charging energy transmitted by the wireless charging transmitter, communicate with the wireless charging transmitter, and monitor the operating scenario of the wireless charging receiver 100. It may also be that the same coil of the plurality of receiving coils 101 is multiplexed in a time-division mode, so as to receive the charging energy transmitted by the wireless charging transmitter and monitor the operating scenario of the wireless charging receiver 100 in a time-division mode.

In the example of the present disclosure, the wireless charging receiver is provided with the plurality of receiving coils, comprising the first type of coil communicating with the wireless charging transmitter, the second type of coil receiving the charging energy transmitted by the wireless charging transmitter, and the third type of coil sending the monitoring signal to monitor the operating scenario of the wireless charging receiver. The first type of coil is a designated coil in the plurality of receiving coils or comprises different receiving coils that are multiplexed in a time-division mode. The second type of coil and the first type of coil are the same coil, or the different coils. The third type of coil and the second type of coil may be the same coil that is multiplexed in a time-division mode. Therefore, the flexible and effective control of the plurality of receiving coils disposed at the wireless charging receiver is realized, so as to achieve different uses functions.

Figure 3A:
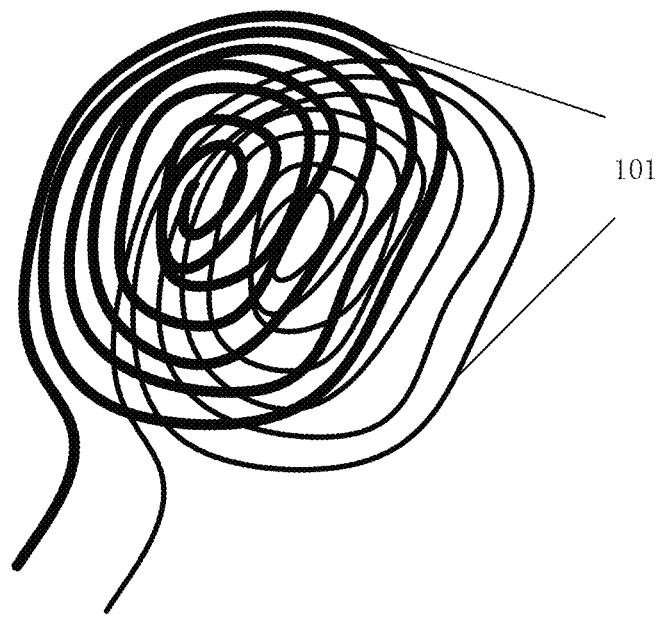
FIG. 3A is a schematic diagram of disposing modes of a plurality of receiving coils shown according to one or more examples of the present disclosure.
Figure 3B:
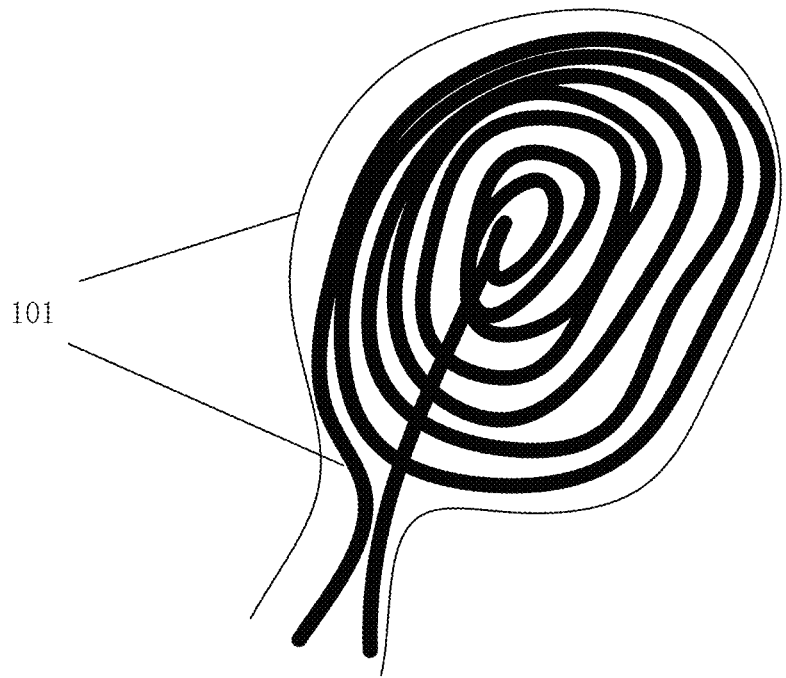
FIG. 3B is a schematic diagram of disposing modes of a plurality of receiving coils shown according to one or more examples of the present disclosure.

FIGS. 3A and 3B are schematic diagrams of disposing modes of the plurality of receiving coils shown according to an example of the present disclosure. As shown in FIG. 3A, the plurality of receiving coils 101 are stacked one above the other. As shown in FIG. 3B, the plurality of receiving coils 101 are nested inside and outside.

In some examples, each of the plurality of receiving coils 101 has different numbers of turns and/or different magnetic induction coupling areas, so as to meet the usage requirements for different charging power and charging speed. It is understandable that each of the plurality of receiving coils 101 may also have the same number of turns, and all the receiving coils may also have the same magnetic induction coupling area.

In some examples, each of the plurality of receiving coils 101 may adopt different induction mode, for example, the plurality of receiving coils 101 comprise the receiving coils adopting a high-frequency induction mode, and the receiving coils adopting low-frequency induction, and the different coils operate at different frequency bands.

Figure 4A:
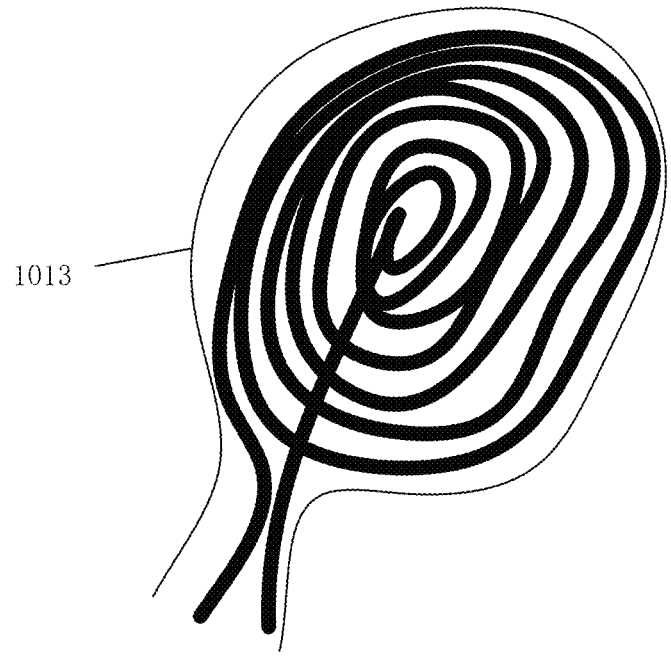
FIG. 4A is a schematic diagram of disposing modes of a plurality of receiving coils shown according to one or more examples of the present disclosure.
Figure 4B:
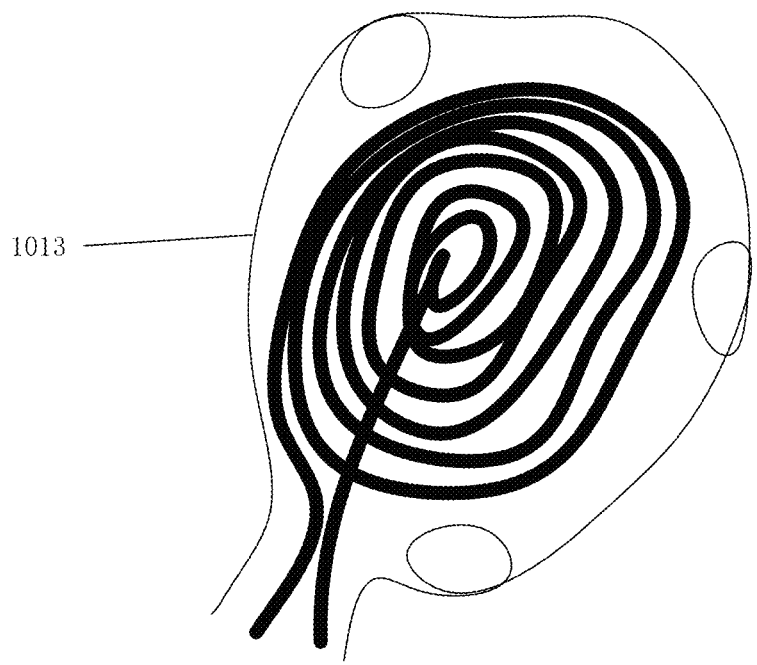
FIG. 4B is a schematic diagram of disposing modes of a plurality of receiving coils shown according to one or more examples of the present disclosure.
Figure 4C:
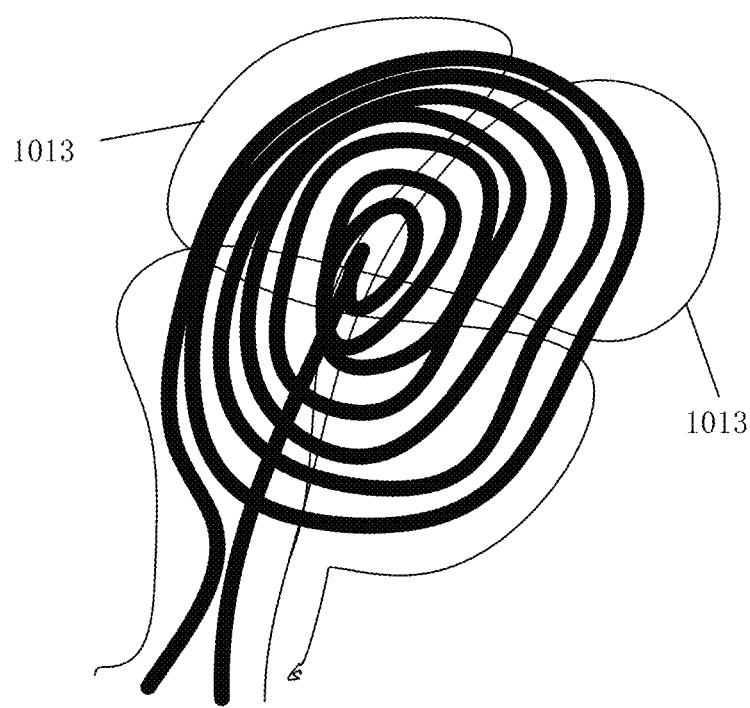
FIG. 4C is a schematic diagram of disposing modes of a plurality of receiving coils shown according to one or more examples of the present disclosure.

FIGS. 4A-4C are schematic diagrams of disposing modes of the plurality of receiving coils shown according to another example of the present disclosure. The third type of coil 1013 may be single-turn or multi-turn ring-shaped winding. As shown in FIG. 4A, the third type of coil 1013 is single-turn ring-shaped winding. As shown in FIG. 4B, the third type of coil 1013 is in a ring-shaped winding shape for enhancing the monitoring signal. As shown in FIG. 4C, the third type of coil 1013 is multi-turn ring-shaped winding.

Further, a specific shape may also be wound on a ring to enhance the monitoring signal. The third type of coil 1013 may also be composed of a plurality of receiving coils, and a controller performs differential comparison on the monitoring signals of the third type of coils 1013 to determine a change in the operating scenario of a device.

In the example of the present disclosure, the number of the third type of coil 1013 may be one or more. For example, when there are the plurality of third type of coils 1013, the differential comparison may be performed on the signals in the plurality of third type of coils 1013 to determine the change of the operating scenario of the wireless charging receiver 100. For example, in a process that the mobile terminal with the wireless charging receiver 100 uses the wireless charging device for charging, a relative position of the mobile terminal and the wireless charging device is offset, the signals in the plurality of third type of coils 1013 are compared, if there are differences between the signals, it is determined that the relative position of the terminal and the charging device may be offset, the third type of coils 1013 actively send the monitoring signal, so that the controller performs processing based on the monitoring signal, and the normal progress of the charging process is further ensured.

Figure 5A:
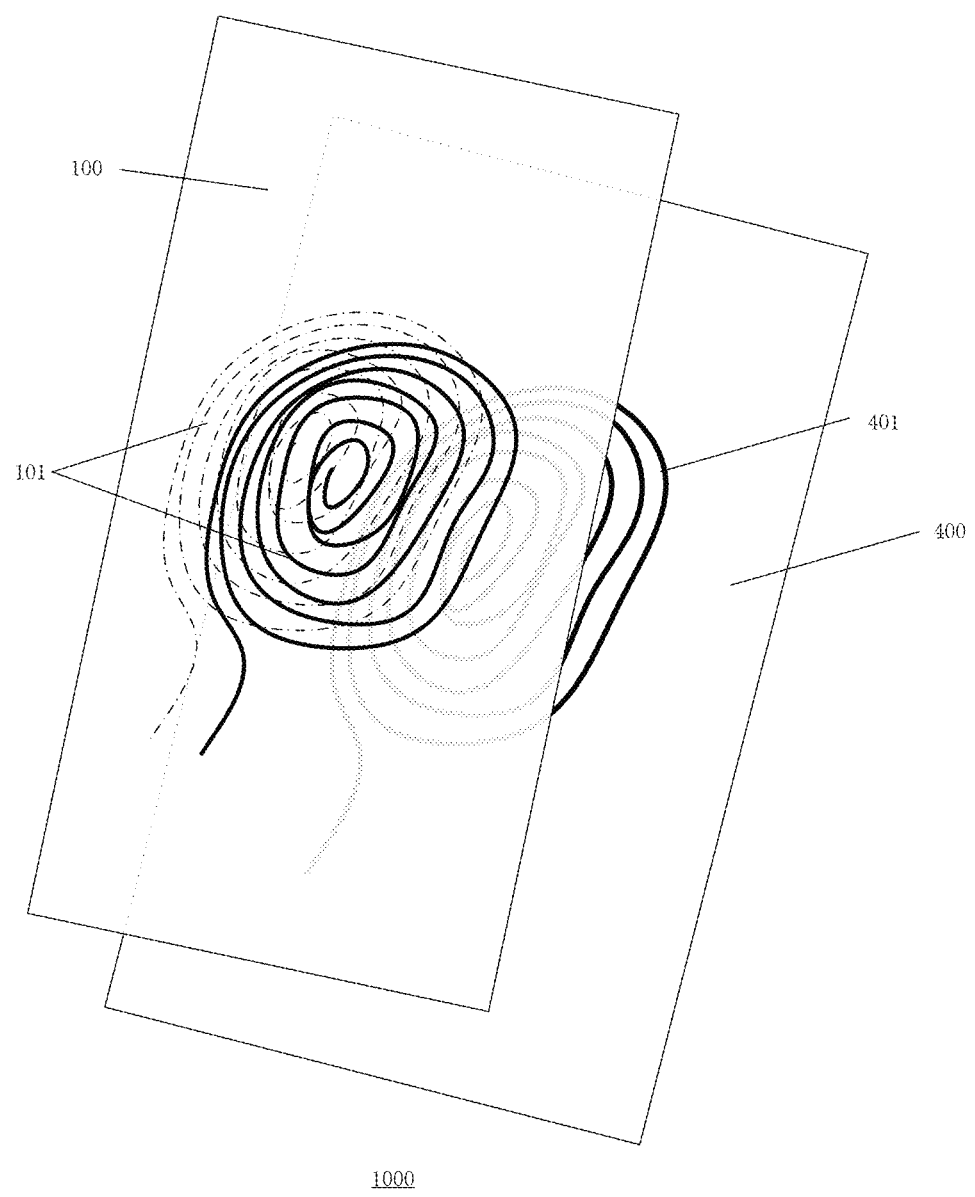
FIG. 5A is a schematic diagram of a system for controlling wireless charging shown according to one or more examples of the present disclosure.
Figure 5B:
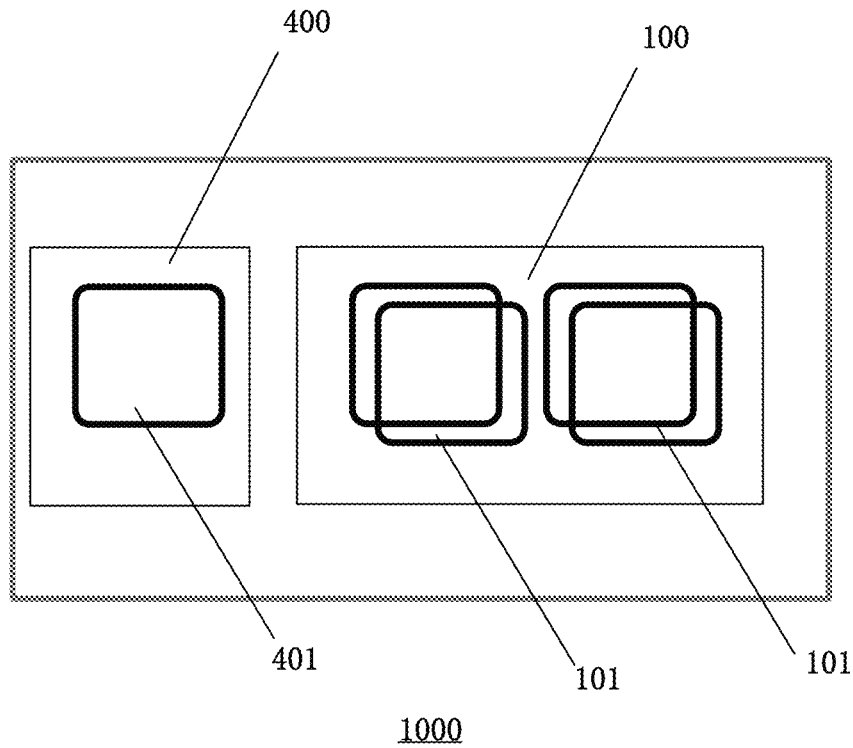
FIG. 5B is a schematic diagram of a system for controlling wireless charging shown according to one or more examples of the present disclosure.

FIGS. 5A and 5B are schematic diagrams of a system for controlling wireless charging shown according to an example of the present disclosure. As shown in FIGS. 5A and 5B, the system for controlling wireless charging 1000 comprises a wireless charging receiver 100 and a wireless charging transmitter 400, and the wireless charging transmitter 400 comprises a transmitting coil 401. The wireless charging receiver 100 comprises a plurality of receiving coils. The plurality of receiving coils at least comprise a first type of coil communicating with the wireless charging transmitter 400, and a second type of coil receiving charging energy transmitted by the wireless charging transmitter 400. The first type of coil is a designated coil in the plurality of receiving coils, or comprises different receiving coils multiplexed in a time-division mode, and the second type of coil and the first type of coil are the same coil, or the different coils.

Through the example of the present disclosure, a plurality of receiving coils are disposed at the wireless charging receiver, which correspond to one transmitting coil of the wireless charging transmitter, and the plurality of receiving coils are in signal communication with the wireless charging transmitter to receive wireless charging energy, thereby increasing the charging power and ensuring the charging quality.

In the system for controlling wireless charging, the plurality of receiving coils may further comprise a third type of coil, the third type of coil may be configured to send a monitoring signal, which is used for monitoring an operating scenario of the wireless charging receiver 100. The third type of coil, the second type of coil and the first type of coil may be the different coils, or the third type of coil and the second type of coil may be the same coil multiplexed in a time-division mode.

In the system for controlling wireless charging, each of the plurality of receiving coils may have different numbers of turns and/or different magnetic induction coupling areas. The third type of coil may be single-turn ring-shaped winding, or multi-turn ring-shaped winding, or in a ring-shaped winding shape for enhancing the monitoring signal.

Figure 6:
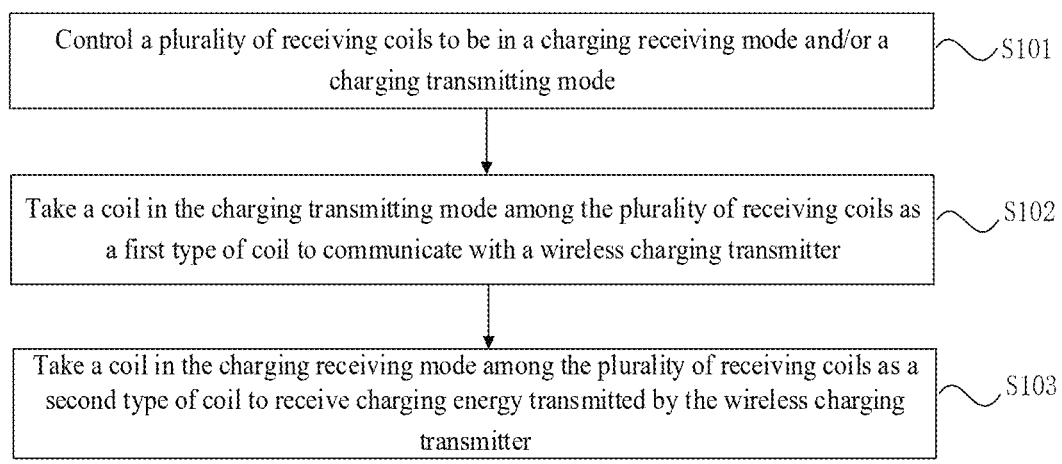
FIG. 6 is a flowchart of a method for controlling wireless charging shown according to one or more examples of the present disclosure.

FIG. 6 is a flowchart of a method for controlling wireless charging shown according to an example of the present disclosure. The method for controlling wireless charging is applied to a wireless charging receiver. The wireless charging receiver comprises a plurality of receiving coils, and the plurality of receiving coils at least comprise a first type of coil and a second type of coil. It is understandable that the wireless charging receiver may be the wireless charging receiver 100 comprising the plurality of receiving coils in the above examples. As shown in FIG. 6, the method for controlling wireless charging comprises the following steps.

At S101, the plurality of receiving coils are controlled to be in a charging receiving mode and/or a signal communication mode.

At S102, a coil in the signal communication mode among the plurality of receiving coils is taken as the first type of coil to communicate with a wireless charging transmitter.

At S103, a coil in the charging receiving mode among the plurality of receiving coils is taken as the second type of coil to receive charging energy transmitted by the wireless charging transmitter.

In the example of the present disclosure, the wireless charging receiver may be applied to a mobile terminal. The wireless charging receiver communicates with the wireless charging transmitter to receive the energy and communication information transmitted by the wireless charging transmitter, so as to realize the charging of the mobile terminal with the wireless charging receiver. The wireless charging receiver comprises the plurality of receiving coils, and the plurality of receiving coils are controlled to be in the charging receiving mode or the signal communication mode. The coil in the signal communication mode, namely the first type of coil, is controlled to communicate with the wireless charging transmitter, and the first type of coil may communicate with the wireless charging transmitter based on load communication information. The coil in the charging receiving mode, namely the second type of coil, is controlled to receive the charging energy transmitted by the wireless charging transmitter, and the second type of coil may receive the energy based on load energy information, so as to realize the charging of the terminal.

Through the example of the present disclosure, by disposing the plurality of receiving coils at the wireless charging receiver, the plurality of receiving coils are controlled to be in the charging receiving mode and/or the signal communication mode, that is, the first type of coil in the receiving coils is controlled to be in signal communication with the wireless charging transmitter, and the second type of coil in the receiving coils is controlled to receive the wireless charging energy, thereby realizing flexible and effective control of the plurality of receiving coils at the wireless charging receiver.

In some examples, the wireless charging receiver communicates with the wireless charging transmitter to receive the energy and communication information transmitted by the wireless charging transmitter. The wireless charging receiver comprises the plurality of receiving coils. The operating modes comprise the charging receiving mode and the signal communication mode. The same receiving coil in the plurality of receiving coils is controlled to be in the charging receiving mode and the signal communication mode in a time-division mode, that is, the same receiving coil may be used as the first type of coil to communicate with the wireless charging transmitter, or as the second type of coil to receive the charging energy transmitted by the wireless charging transmitter at different moments, thereby realizing different control of the same receiving coil to realize different functions in different operating scenarios.

In some examples, the wireless charging receiver communicates with the wireless charging transmitter to receive the energy and communication information transmitted by the wireless charging transmitter. The wireless charging receiver comprises the plurality of receiving coils. The operating modes of the plurality of receiving coils comprise the charging receiving mode and the signal communication mode. The different coils in the plurality of receiving coils are controlled to alternately be in the charging receiving mode or the signal communication mode respectively. That is, the different coils in the plurality of receiving coils may alternately be used as the first type of coil to communicate with the wireless charging transmitter, or as the second type of coil to receive the charging energy transmitted by the wireless charging transmitter. For example, the different coils are controlled to be in the charging receiving mode at the current moment, and in the signal communication mode at the next moment, thereby realizing different control of the plurality of receiving coils to meet different use functions.

In some examples, the wireless charging receiver communicates with the wireless charging transmitter to receive the energy and communication information transmitted by the wireless charging transmitter. The operating modes comprise the charging receiving mode and the signal communication mode. A first part of coil in the plurality of receiving coils is controlled to be in the charging receiving mode to receive the wireless charging energy, and a second part of coil different from the first part of coil is controlled to be in the signal communication mode to communicate with the wireless charging transmitter, thereby realizing different control of the plurality of receiving coils to meet different use functions.

Figure 7:
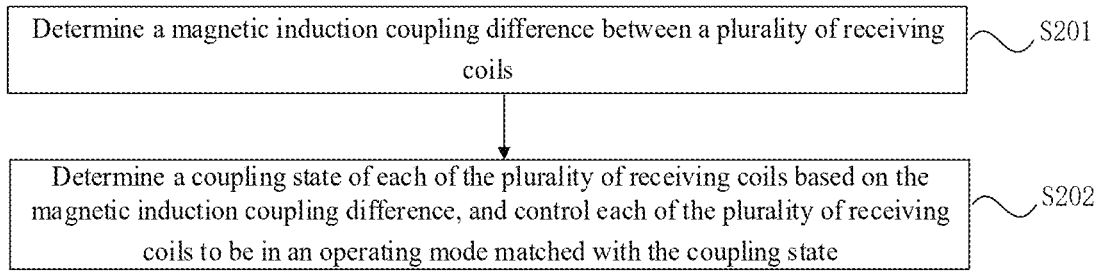
FIG. 7 is a flowchart of a method for determining an operating mode of a coil shown according to one or more examples of the present disclosure.

FIG. 7 is a flowchart of a method for determining the operating mode of the coil shown according to the example of the present disclosure. As shown in FIG. 7, the method of determining the operating mode of the coil comprises the following steps.

At S201, a magnetic induction coupling difference between the plurality of receiving coils is determined.

At S202, a coupling state of each of the plurality of receiving coils is determined based on the magnetic induction coupling difference, and each of the plurality of receiving coils is controlled to be in an operating mode matched with the coupling state.

In the example of the present disclosure, the wireless charging receiver communicates with the wireless charging transmitter to receive the energy and the communication information transmitted by the wireless charging transmitter, so as to realize the charging of the mobile terminal with the wireless charging receiver. The wireless charging receiver comprises the plurality of receiving coils. The magnetic induction coupling difference between the plurality of receiving coils is determined. A coupling state of each of the plurality of receiving coils is determined based on the magnetic induction coupling difference. The operating mode matched with the coupling state of each coil is determined, that is, the receiving coils are determined to receive the load communication information sent by the wireless charging transmitter, or receive the wireless charging energy.

Through the example of the present disclosure, the plurality of receiving coils are disposed at the wireless charging receiver, the magnetic induction coupling difference between the plurality of receiving coils is determined, the coupling state of each coil is determined, and the operating mode matched with the coupling state of each coil is determined, thereby realizing the flexible control of the plurality of receiving coils at the wireless charging receiver to ensure the charging quality and the charging efficiency.

Figure 8:
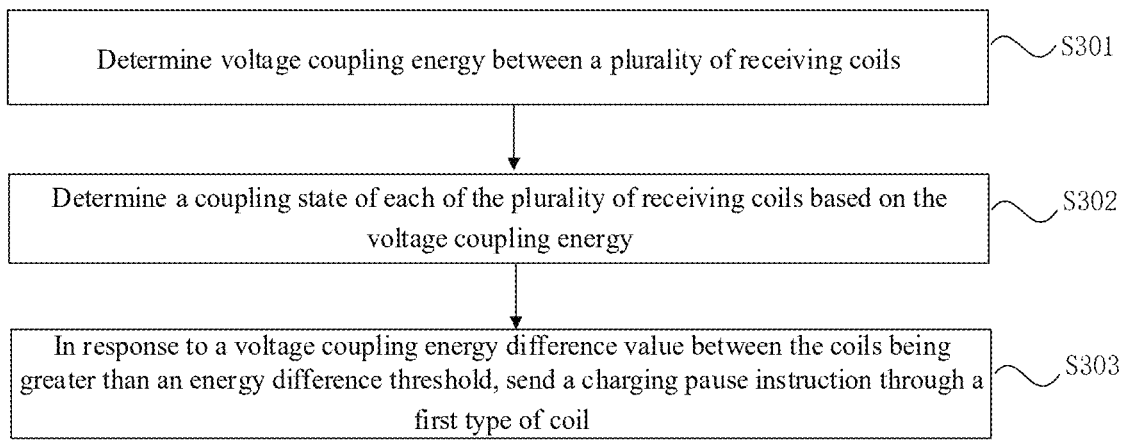
FIG. 8 is a flowchart of a method for controlling wireless charging shown according to one or more examples of the present disclosure.

In some examples, the magnetic induction coupling difference comprises voltage coupling energy. FIG. 8 is a flowchart of a method for controlling wireless charging shown according to another example of the present disclosure. As shown in FIG. 8, the method for controlling wireless charging comprises the following steps.

At S301, the voltage coupling energy between the plurality of receiving coils is determined.

At S302, the coupling state of each of the plurality of receiving coils is determined based on the voltage coupling energy.

At S303, in response to a voltage coupling energy difference value between the coils being greater than an energy difference threshold, a charging pause instruction is sent through the first type of coil.

In the example of the present disclosure, the wireless charging receiver communicates with the wireless charging transmitter to receive the energy and the communication information transmitted by the wireless charging transmitter, so as to realize the charging of the mobile terminal with the wireless charging receiver. The wireless charging receiver comprises the plurality of receiving coils. The voltage coupling energy between the plurality of receiving coils is determined. If the voltage coupling energy difference value between the coils is greater than the energy difference threshold, the charging pause instruction is sent to the wireless charging transmitter through the first type of coil, so as to shut down the transmitter or interrupt energy transmission. For example, the voltage energy coupled by the coil 1 and the voltage energy coupled by the coil 2 in the plurality of receiving coils are respectively V1 and V2, and the voltage coupling energy difference value between the coil 1 and the coil 2 may be expressed as V1-V2. If there is foreign matter outside during the wireless charging process, the foreign matter affects the magnetic induction coupling, the coupling of the coil 1 is interfered, the voltage energy coupled by the coil 1 has an attenuation change of V3, and the voltage coupling energy difference value between the coil 1 and the coil 2 is changed to (V1-V2-V3). If the foreign matter has a significant influence on the magnetic induction coupling, it is determined that when the voltage coupling energy difference value between the coil 1 and the coil 2 is greater than the energy difference threshold, the normal progress of charging is affected, and the charging pause instruction is sent to the wireless charging transmitter through the first type of coil, so as to shut down the transmitter or interrupt energy transmission.

Through the example of the present disclosure, when the voltage coupling energy difference value between the different receiving coils is greater than the energy difference threshold, the charging pause instruction is sent through the first type of coil to interrupt the charging process, thereby ensuring the safety of the charging process.

Figure 9:
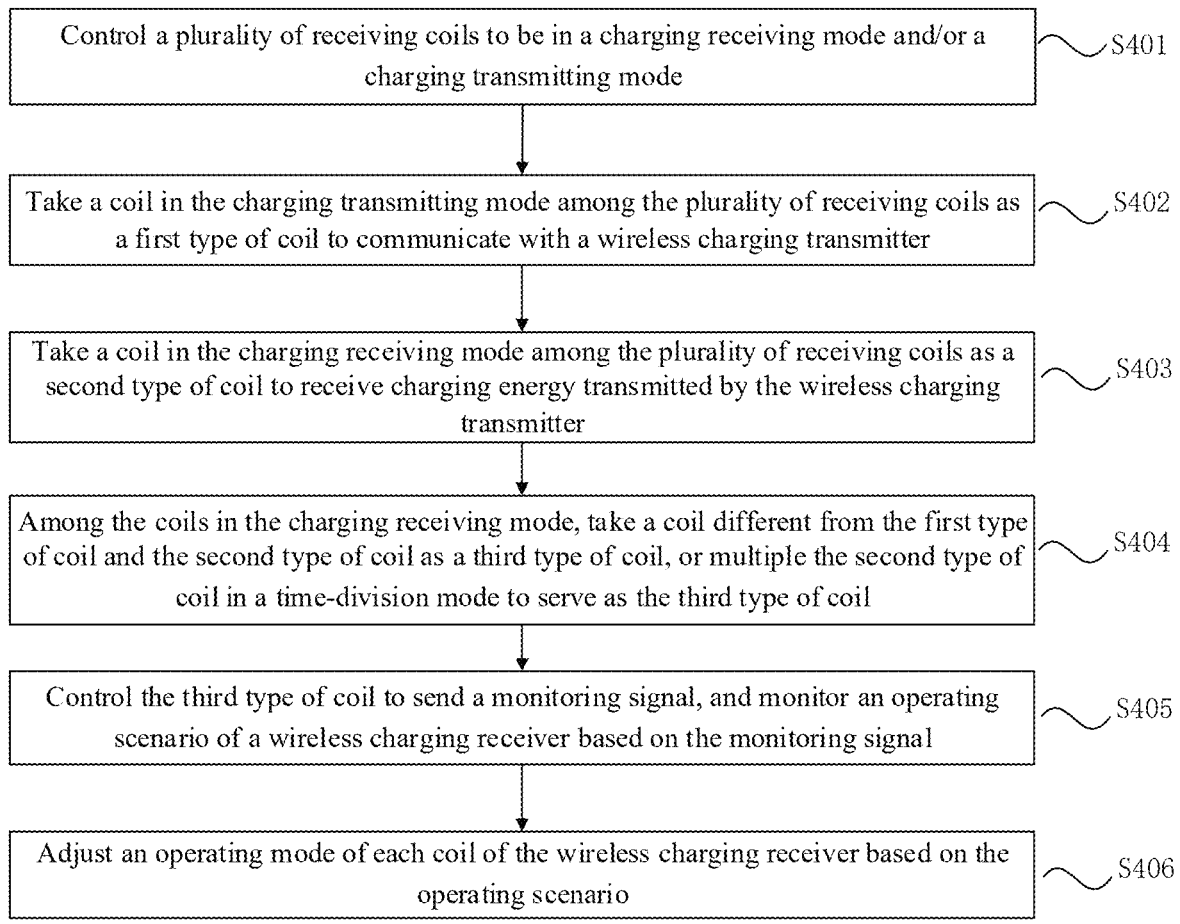
FIG. 9 is a flowchart of a method for controlling wireless charging shown according to one or more examples of the present disclosure.

FIG. 9 is a flowchart of a method for controlling wireless charging according to still another example of the present disclosure. As shown in FIG. 9, the method for controlling wireless charging comprises the following steps.

At S401, the plurality of receiving coils are controlled to be in the charging receiving mode and/or the signal communication mode.

At S402, the coil in the signal communication mode among the plurality of receiving coils is taken as the first type of coil to communicate with the wireless charging transmitter.

At S403, the coil in the charging receiving mode among the plurality of receiving coils is taken as the second type of coil to receive the charging energy transmitted by the wireless charging transmitter.

At S404, among the coils in the charging receiving mode, a coil different from the first type of coil and the second type of coil is taken as a third type of coil, or the second type of coil is multiplexed in a time-division mode to serve as the third type of coil.

At S405, the third type of coil is controlled to send a monitoring signal, and an operating scenario of the wireless charging receiver is monitored based on the monitoring signal.

At S406, the operating mode of each coil of the wireless charging receiver is adjusted based on the operating scenario.

In the example of the present disclosure, the wireless charging receiver is provided with the plurality of receiving coils, comprising the first type of coil communicating with the wireless charging transmitter, the second type of coil receiving the charging energy transmitted by the wireless charging transmitter, and the third type of coil sending the monitoring signal to monitor the operating scenario of the wireless charging receiver. The third type of coil actively sends the monitoring signal to monitor the change of the operating scenario of the wireless charging receiver, and an abnormal operating scenario may be found. It may be that the coil, different from the first type of coil and the second type of coil, among the coils in the charging receiving mode may be taken as the third type of coil. Alternatively, the second type of coil may be multiplexed in the time-division mode to serve as the third type of coil. The third type of coil and the second type of coil may be the same coil that is multiplexed in the time-division mode, and this coil may receive the charging energy transmitted by the wireless charging transmitter, or send the monitoring signal to monitor the operating scenario of the wireless charging receiver at different moments. For example, in the process of wireless charging, when there is foreign matter outside the wireless charging receiver, and the magnetic induction coupling of the receiving coils is affected, the third type of coil actively sends the monitoring signal to report abnormal changes in the operating scenario. Based on the operating scenario, a controller adjusts the operating mode of each coil at the wireless charging receiver, so as to handle the abnormal situation, thereby further ensuring the charging quality. For another example, when there are the plurality of third type of coils, signals in the plurality of third type of coils are compared separately, and if the signals have significant differences through comparison, it is determined that the operating scenario of a device changes. For example, in the process that the mobile terminal with the wireless charging receiver uses the wireless charging device for charging, the relative position of the mobile terminal and the wireless charging device is offset, the signals in the plurality of third type of coils are compared and have differences, it is determined that the position where the device is placed has changed, and processing is performed based on the monitoring signal, thereby further ensuring the charging quality.

Through the example of the present disclosure, the third type of coil among the plurality of receiving coils is controlled to send the monitoring signal, the operating scenario is determined based on the monitoring signal sent by the third type of coil, and the operating modes of the plurality of receiving coils of the wireless charging receiver are adjusted, thereby realizing the monitoring of the operating scenario of the wireless charging receiver through the receiving coils, and ensuring the normal progress of charging. Thus, the multiple functions of the plurality of receiving coils of the wireless charging receiver are controlled.

Based on the same concept, an example of the present disclosure further provides an apparatus for controlling wireless charging.

It can be understood that, in order to implement the above functions, the apparatus provided by the example of the present disclosure comprises corresponding hardware structure and/or software module for executing each function. In combination with units and algorithm steps of all the examples disclosed in the examples of the present disclosure, the example of the present disclosure can be implemented in the form of hardware or a combination of hardware and computer software. Whether a certain function is executed by hardware or in a mode that the computer software drives the hardware depends on the specific application and design constraint conditions of the technical solution. Those skilled in the art can use different methods for each specific application to implement the described functions, but such implementation should not be considered as going beyond the scope of the technical solutions of the examples of the present disclosure.

Figure 10:
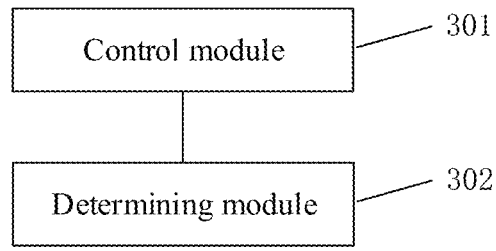
FIG. 10 is a block diagram of an apparatus for controlling wireless charging shown according to one or more examples of the present disclosure.

FIG. 10 is a block diagram of the apparatus for controlling wireless charging shown according to the example of the present disclosure. Referring to FIG. 10, the apparatus for controlling wireless charging is applied to a wireless charging receiver. The wireless charging receiver comprises a plurality of receiving coils, and the plurality of receiving coils at least comprise a first type of coil and a second type of coil. The wireless charging control apparatus 300 comprises a control module 301 and a determining module 302.

The control module 301 is configured to control the plurality of receiving coils to be in a charging receiving mode and/or a signal communication mode.

The determining module 302 is configured to take a coil in the signal communication mode among the plurality of receiving coils as the first type of coil to communicate with a wireless charging transmitter, and take a coil in the charging receiving mode among the plurality of receiving coils as the second type of coil to receive charging energy transmitted by the wireless charging transmitter.

In one example, the control module 301 controls the plurality of receiving coils to be in the charging receiving mode and/or the signal communication mode by at least one of: controlling the same coil in the plurality of receiving coils to be in the charging receiving mode and the signal communication mode in a time-division mode; controlling different coils in the plurality of receiving coils to alternately be in the charging receiving mode or the signal communication mode; and controlling a first part of coil in the plurality of receiving coils to be in the charging receiving mode, and controlling a second part of coil to be in the signal communication mode, wherein the first part of coil is different from the second part of coil.

In one example, the determining module 302 is further configured to: determine a magnetic induction coupling difference between the plurality of receiving coils; and determine a coupling state of each of the plurality of receiving coils based on the magnetic induction coupling difference, and control each of the plurality of receiving coils to be in an operating mode matched with the coupling state.

In one example, the magnetic induction coupling difference comprises voltage coupling energy. The control module 301 is further configured to: in response to a voltage coupling energy difference value between the coils being greater than an energy difference threshold, send a charging pause instruction through the first type of coil.

In one example, the determining module 302 is further configured to: among the coils in the charging receiving mode, take a coil different from the first type of coil and the second type of coil as a third type of coil, or multiplex the second type of coil in a time-division mode to serve as the third type of coil. The control module 301 is further configured to: control the third type of coil to send a monitoring signal, and monitor an operating scenario of the wireless charging receiver based on the monitoring signal; and adjust the operating mode of each coil at the wireless charging receiver based on the operating scenario.

Regarding the apparatus in the above example, the specific manner in which each module executes operation has been described in detail in the example relevant to the method and will not be elaborated here.

Figure 11:
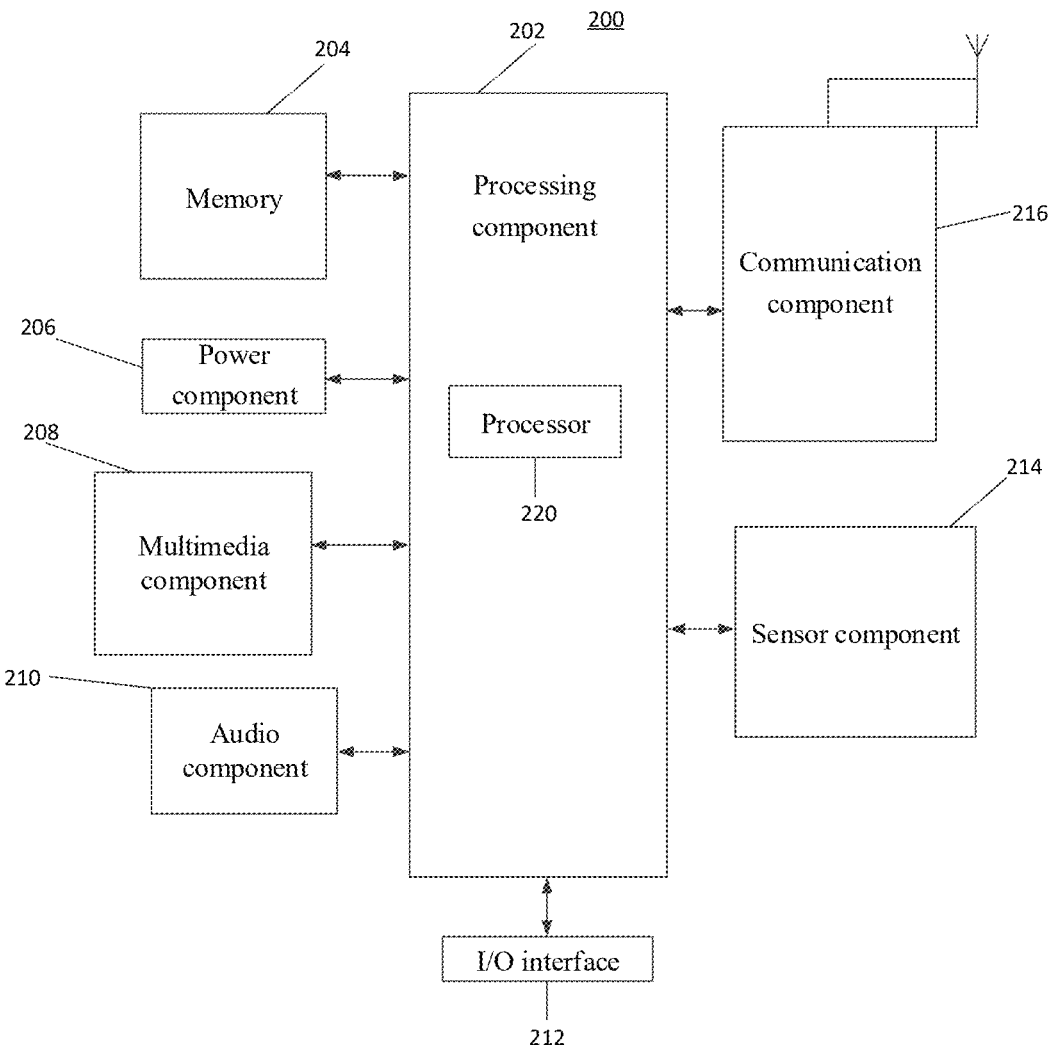
FIG. 11 is a block diagram of an apparatus for controlling wireless charging shown according to one or more examples of the present disclosure.

FIG. 11 is a block diagram of an apparatus 200 for controlling wireless charging according to an example of the present disclosure. Referring to FIG. 11, the apparatus 200 may comprise a processor 220 and a memory 204. The memory 204 may be configured to store executable instructions of the processor 220, wherein the processor 220 may be configured to execute the executable instructions to implement the method for controlling wireless charging described in any of the above examples.

For example, the apparatus 200 may be a mobile phone, a computer, a digital broadcasting terminal, a message transceiving device, a game console, a tablet, a medical device, a fitness device, a personal digital assistant, etc.

Referring to FIG. 11, the apparatus 200 may include one or more of the following components: a processing component 202, a memory 204, an electrical component 206, a multimedia component 208, an audio component 210, an input/output (I/O) interface 212, a sensor component 214, and a communication component 216.

The processing component 202 generally controls the overall operations of the apparatus 200, such as operations associated with display, telephone call, data communication, camera operation, and recording operation. The processing component 202 may include one or more processors 220 to execute instructions, so as to complete all or part of the steps of the above method. In addition, the processing component 202 may include one or more modules to facilitate the interaction between the processing component 202 and other components. For example, the processing component 202 may include a multimedia module to facilitate the interaction between the multimedia component 208 and the processing component 202.

The memory 204 is configured to store various types of data to support the operations on the apparatus 200. Examples of these data include instructions for any application program or method operated on the apparatus 200, contact data, phone book data, messages, pictures, videos, etc. The memory 204 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 206 provides electric power for various components of the apparatus 200. The electrical component 206 may include a power management system, one or more power supplies, and other components associated with generating, managing, and distributing electric power for the apparatus 200.

The multimedia component 208 includes a screen that provides an output interface between the apparatus 200 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, slide, and gestures on the touch panel. The touch sensor may not only sense the boundary of the touch or slide action, but also detect the duration and pressure related to the touch or slide operation. In some examples, the multimedia component 208 includes a front camera and/or a rear camera. When the apparatus 200 is in an operating mode, such as a shooting mode or a video mode, the front camera and/or the rear camera may receive external multimedia data. The front camera and rear camera each may be a fixed optical lens system or have a focal length and optical zoom capabilities.

The audio component 210 is configured to output and/or input an audio signal. For example, the audio component 210 includes a microphone (IC), and when the apparatus 200 is in an operating mode, such as a call mode, a recording mode, and a voice recognition mode, the microphone is configured to receive an external audio signal. The received audio signal may be further stored in the memory 204 or sent via the communication component 216. In some examples, the audio component 210 further includes a speaker configured to output the audio signal.

The I/O interface 212 provides an interface between the processing component 202 and a peripheral interface module. The above peripheral interface module may be a keyboard, a click wheel, buttons, etc. These buttons may include, but are not limited to: a home button, a volume button, a start button, and a lock button.

The sensor component 214 includes one or more sensors configured to provide the apparatus 200 with various aspects of state evaluation. For example, the sensor component 214 may detect a startup/shutdown state of the apparatus 200 and relative positioning of the components, such as a display and a keypad of the apparatus 200. The sensor component 214 may further detect position change of the apparatus 200 or a component of the apparatus 200, the presence or absence of contact between the user and the apparatus 200, orientation or acceleration/deceleration of the apparatus 200, and temperature change of the apparatus 200. The sensor component 214 may include a proximity sensor configured to detect the presence of nearby objects when there is no any physical contact. The sensor component 214 may further include a light sensor, such as a CMOS or CCD image sensor, for use in imaging applications. In some examples, the sensor component 214 may further include an acceleration sensor, a gyroscope sensor, a magnetic sensor, a pressure sensor, or a temperature sensor.

The communication component 216 is configured to facilitate wired or wireless communication between the apparatus 200 and other devices. The apparatus 200 may access a wireless network based on a communication standard, such as WiFi, 2G or 3G, or a combination thereof. In an example, the communication component 216 receives a broadcast signal or broadcast related information from an external broadcast management system via a broadcast channel. In an example, the communication component 216 further includes a near field communication (NFC) module to promote short-range communications. For example, the NFC module may be implemented based on a radio frequency identification (RFID) technology, an infrared data association (IrDA) technology, an ultra-wideband (UWB) technology, a Bluetooth (BT) technology and other technologies.

In the example, the apparatus 200 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic elements, to perform the above method.

In the example, a non-transitory computer-readable storage medium including instructions is further provided, such as a memory 204 including instructions, which may be executed by a processor 220 of an apparatus 200 to complete the above method. For example, the non-transitory computer-readable storage medium may be an ROM, a random access memory (RAM), a CD-ROM, a magnetic tape, a floppy disk, an optical data storage device, etc.

According to a first aspect of the present disclosure, a wireless charging receiver is provided. The wireless charging receiver comprises a plurality of receiving coils; the plurality of receiving coils at least comprise a first type of coil communicating with a wireless charging transmitter, and a second type of coil receiving charging energy transmitted by the wireless charging transmitter; the first type of coil is a designated coil in the plurality of receiving coils, or comprises different receiving coils multiplexed in a time-division mode; and the second type of coil and the first type of coil are the same coil or different coils.

According to a second aspect of the present disclosure, a wireless charging system is provided. The wireless charging system comprises a wireless charging transmitter and a wireless charging receiver; the wireless charging transmitter comprises a transmitting coil; and the wireless charging receiver is the above-mentioned wireless charging receiver comprising a plurality of receiving coils. The plurality of receiving coils at least comprise a first type of coil communicating with the wireless charging transmitter, and a second type of coil receiving charging energy transmitted by the wireless charging transmitter; the first type of coil is a designated coil in the plurality of receiving coils, or comprises different receiving coils multiplexed in a time-division mode; and the second type of coil and the first type of coil are the same coil, or the different coils.

According to a third aspect of the present disclosure, a method for controlling wireless charging is provided, and applied to a wireless charging receiver. The wireless charging receiver comprises a plurality of receiving coils, and the plurality of receiving coils at least comprise a first type of coil and a second type of coil. The method for controlling wireless charging comprises: controlling the plurality of receiving coils to be in a charging receiving mode or a signal communication mode; taking a coil in the signal communication mode among the plurality of receiving coils as the first type of coil to communicate with a wireless charging transmitter; and taking a coil in the charging receiving mode among the plurality of receiving coils as the second type of coil to receive charging energy transmitted by the wireless charging transmitter.

According to a fourth aspect of the present disclosure, an apparatus for controlling wireless charging is provided, comprising: a processor; and a memory configured to store executable instructions of the processor, wherein the processor is configured to execute the executable instructions to implement the above-mentioned method for controlling wireless charging.

According to a fifth aspect of the present disclosure, a non-transitory computer-readable storage medium is provided. When instructions in the storage medium are executed by a processor of a mobile terminal, the mobile terminal may implement the above-mentioned method for controlling wireless charging.

It can be understood that in the present disclosure, "a plurality of" refers to two or more, and other quantifiers are similar. "And/or" describes the association relationship of the associated objects, and indicates that there can be three types of relationships, for example, A and/or B can indicate: A exists alone, A and B exist at the same time, and B exists alone. The character "/" generally indicates that the previous and next associated objects are in an "or" relationship. The singular forms "a", "an" and "the" are also intended to include plural forms, unless the context clearly indicates other meanings. Reference to the singular is also to be construed to relate to the plural.

It can be further understood that the terms "first", "second", etc. are used to describe various information, but this information should not be limited to these terms. These terms are only used to distinguish the same type of information from each other, and do not indicate a specific order or degree of importance. In fact, expressions such as "first" and "second" can be used interchangeably. For example, without departing from the scope of the present disclosure, first information may also be referred to as second information, and similarly, the second information may also be referred to as the first information.

It can be further understood that, unless otherwise specified, "connected" includes a direct connection between the two without other members, or an indirect connection between the two with other elements therebetween.

It can be further understood that in the examples of the present disclosure, although the operations are described in a specific order in the drawings, they should not be understood as requiring these operations to be executed in the specific order shown or in a serial order, or requiring all the shown operations to be executed to get the desired result. In certain circumstances, multitasking and parallel processing may be advantageous.

Those skilled in the art will easily think of other examples of the present disclosure after considering the specification and practicing the disclosure disclosed herein. The present application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The specification and the examples are regarded as exemplary only, and the true scope and spirit of the present disclosure are pointed out by the appended claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A wireless charging receiver, comprising:
a plurality of receiving coils comprising a first type of coil communicating with a wireless charging transmitter, and a second type of coil receiving charging energy transmitted by the wireless charging transmitter, wherein the first type of coil comprises a designated coil in the plurality of receiving coils, or comprises different receiving coils multiplexed in a time-division mode; and
a controller configured to:
control the plurality of receiving coils to be in a charging receiving mode or a signal communication mode;
determine a magnetic induction coupling difference between the plurality of receiving coils; and
determine a coupling state of each of the plurality of receiving coils based on the magnetic induction coupling difference; and
control each of the plurality of receiving coils to be in an operating mode matched with the coupling state;
wherein the magnetic induction coupling difference comprises voltage coupling energy, and wherein the controller is further configured to send a charging pause instruction through the first type of coil in response to determining that a voltage coupling energy difference value between the plurality of receiving coils is greater than an energy difference threshold.

2. The wireless charging receiver according to claim 1, wherein each of the plurality of receiving coils comprises different numbers of turns or different magnetic induction coupling areas.

3. The wireless charging receiver according to claim 1, wherein the third type of coil is single-turn ring-shaped winding, or multi-turn ring-shaped winding, or in a ring-shaped winding shape for enhancing the monitoring signal.

4. The wireless charging receiver according to claim 1, wherein the second type of coil and the first type of coil are same coil, or different coils.

5. The wireless charging receiver according to claim 1, wherein the plurality of receiving coils further comprise a third type of coil, the third type of coil is configured to send a monitoring signal to the controller of the wireless charging receiver, the monitoring signal is for monitoring an operating scenario of the wireless charging receiver;
wherein the third type of coil, the second type of coil and the first type of coil are different coils, or the third type of coil and the second type of coil are same coil multiplexed in a time-division mode.

6. A wireless charging system, comprising:
a wireless charging transmitter comprises a transmitting coil; and
a wireless charging receiver comprises a plurality of receiving coils;
wherein the plurality of receiving coils at least comprise a first type of coil communicating with the wireless charging transmitter, and a second type of coil receiving charging energy transmitted by the wireless charging transmitter;
wherein the first type of coil is a designated coil in the plurality of receiving coils, or comprises different receiving coils multiplexed in a time-division mode;
wherein the wireless charging receiver further comprises a controller configured to:
control the plurality of receiving coils of the wireless charging receiver to be in a charging receiving mode or a signal communication mode;
determine a magnetic induction coupling difference between the plurality of receiving coils; and
determine a coupling state of each of the plurality of receiving coils based on the magnetic induction coupling difference; and
control each of the plurality of receiving coils to be in an operating mode matched with the coupling state;
wherein the magnetic induction coupling difference comprises voltage coupling energy, and the controller is further configured to send a charging pause instruction through the first type of coil in response to determining that a voltage coupling energy difference value between the plurality of receiving coils is greater than an energy difference threshold.

7. The wireless charging system according to claim 6, wherein the plurality of receiving coils further comprise a third type of coil, the third type of coil is configured to send a monitoring signal to the controller of the wireless charging receiver, the monitoring signal is for monitoring an operating scenario of the wireless charging receiver;
wherein the third type of coil, the second type of coil and the first type of coil are different coils, or the third type of coil and the second type of coil are same coil multiplexed in a time-division mode.

8. The wireless charging system according to claim 7, wherein the third type of coil is single-turn ring-shaped winding, or multi-turn ring-shaped winding, or in a ring-shaped winding shape for enhancing the monitoring signal.

9. A method for controlling wireless charging, comprising:
controlling a plurality of receiving coils of a wireless charging receiver to be in a charging receiving mode or a signal communication mode, wherein the plurality of receiving coils comprise a first type of coil and a second type of coil;
taking a coil in the signal communication mode among the plurality of receiving coils as the first type of coil to communicate with a wireless charging transmitter;
taking a coil in the charging receiving mode among the plurality of receiving coils as the second type of coil to receive charging energy transmitted by the wireless charging transmitter;
wherein the method further comprises:
determining a magnetic induction coupling difference between the plurality of receiving coils;
determining a coupling state of each of the plurality of receiving coils based on the magnetic induction coupling difference; and
controlling each of the plurality of receiving coils to be in an operating mode matched with the coupling state;
wherein the magnetic induction coupling difference comprises voltage coupling energy, and the method for controlling wireless charging further comprises:
in response to determining that a voltage coupling energy difference value between the plurality of receiving coils is greater than an energy difference threshold, sending a charging pause instruction through the first type of coil.

10. The method for controlling wireless charging according to claim 9, wherein the plurality of receiving coils are controlled to be in the charging receiving mode or the signal communication mode by at least one of:
controlling same coil in the plurality of receiving coils to be in the charging receiving mode and the signal communication mode in a time-division mode;
controlling different coils in the plurality of receiving coils to alternately be in the charging receiving mode or the signal communication mode respectively; or
controlling a first number of coils in the plurality of receiving coils to be in the charging receiving mode, and controlling a second number of coils to be in the signal communication mode, wherein the first number of coils is different from the second number of coils.

11. A non-transitory computer-readable storage medium, wherein when instructions in the storage medium are executed by a processor of a mobile terminal, the mobile terminal may implement the method for controlling wireless charging according to claim 9.

12. The method for controlling wireless charging according to claim 9, further comprising:
among coils in the charging receiving mode, multiplexing the second type of coil in a time-division mode to serve as a third type of coil;
controlling the third type of coil to send a monitoring signal to a controller of the wireless charging receiver;
monitoring an operating scenario of the wireless charging receiver based on the monitoring signal; and
based on the operating scenario, adjusting an operating mode of each coil of the wireless charging receiver.

13. An apparatus for controlling wireless charging, comprising:
a processor; and
a memory configured to store executable instructions of the processor; wherein
the processor is configured to execute the executable instructions to implement the method for controlling wireless charging according to claim 9.

14. The apparatus for controlling wireless charging according to claim 13, wherein the processor is configured to control the plurality of receiving coils of the wireless charging receiver to be in the charging receiving mode or the signal communication mode by at least one of:
controlling same coil in the plurality of receiving coils to be in the charging receiving mode and the signal communication mode in a time-division mode;
controlling different coils in the plurality of receiving coils to alternately be in the charging receiving mode or the signal communication mode respectively; or
controlling a first number of coils in the plurality of receiving coils to be in the charging receiving mode, and controlling a second number of coils to be in the signal communication mode, wherein the first number of coils is different from the second number of coils.

15. The apparatus for controlling wireless charging according to claim 13, wherein the processor is further configured to execute the executable instructions to:
among coils in the charging receiving mode, take a coil different from the first type of coil and the second type of coil as a third type of coil, or multiplex the second type of coil in a time-division mode to serve as the third type of coil;
control the third type of coil to send a monitoring signal to a controller of the wireless charging receiver;
monitor an operating scenario of the wireless charging receiver based on the monitoring signal; and
based on the operating scenario, adjust an operating mode of each coil of the wireless charging receiver.

16. The wireless charging system according to claim 6, wherein each of the plurality of receiving coils comprises different numbers of turns or different magnetic induction coupling areas.

* * * * *